US 6,694,200 B1

(12) United States Patent
Naim

(10) Patent No.: US 6,694,200 B1
(45) Date of Patent: Feb. 17, 2004

(54) HARD DISK BASED PORTABLE DEVICE

(75) Inventor: Ari B. Naim, Secaucas, NJ (US)

(73) Assignee: Digital5, Inc., Lawrenceville, NJ (US)

( * ) Notice: Subject to any disclaimer, the term of this patent is extended or adjusted under 35 U.S.C. 154(b) by 0 days.

(21) Appl. No.: 09/441,267

(22) Filed: Nov. 16, 1999

Related U.S. Application Data

(63) Continuation-in-part of application No. 09/409,531, filed on Sep. 30, 1999.
(60) Provisional application No. 60/134,989, filed on May 20, 1999, and provisional application No. 60/129,003, filed on Apr. 13, 1999.

(51) Int. Cl.[7] .............................................. G06F 17/00
(52) U.S. Cl. ......................................... 700/94; 711/115
(58) Field of Search ........................... 700/94; 704/270, 704/272, 278; 711/112, 115, 100

(56) References Cited

U.S. PATENT DOCUMENTS

| 5,155,662 | A | | 10/1992 | I-Shou ........................ 361/392 |
| 5,195,022 | A | | 3/1993 | Hoppal et al. ............... 361/391 |
| 5,220,520 | A | | 6/1993 | Kessoku ...................... 364/708 |
| 5,359,698 | A | | 10/1994 | Goldberg et al. ............. 395/2.1 |
| 5,490,235 | A | | 2/1996 | Von Holten et al. ........ 395/2.79 |
| 5,491,774 | A | | 2/1996 | Norris et al. ............... 395/2.79 |
| 5,511,000 | A | | 4/1996 | Kaloi et al. ............. 364/514 A |
| 5,557,541 | A | | 9/1996 | Schulhof et al. ........ 364/514 R |
| 5,680,293 | A | | 10/1997 | McAnally et al. .......... 361/685 |
| 5,737,491 | A | | 4/1998 | Allen et al. ............... 395/2.79 |
| 5,787,399 | A | | 7/1998 | Lee et al. .................... 704/270 |
| 5,809,520 | A | * | 9/1998 | Edwards et al. ............. 711/115 |
| 5,839,108 | A | | 11/1998 | Daberko et al. ............. 704/270 |
| 5,841,979 | A | * | 11/1998 | Schulhof et al. .............. 700/94 |
| 5,870,710 | A | | 2/1999 | Ozawa et al. ................ 704/500 |
| 5,905,632 | A | * | 5/1999 | Seto et al. ................... 361/683 |
| 5,914,941 | A | | 6/1999 | Janky ........................... 370/313 |
| 5,991,727 | A | | 11/1999 | Ono et al. .................... 704/270 |
| 6,332,175 | B1 | * | 12/2001 | Birrell et al. ................ 711/112 |
| 6,408,332 | B1 | * | 6/2002 | Matsumoto et al. ........ 709/219 |

* cited by examiner

Primary Examiner—Xu Mei
(74) Attorney, Agent, or Firm—RatnerPrestia

(57) ABSTRACT

A portable device including a player capable of playing and recording digital data and a hard disk connected to the player for storing a relatively large capacity of digital data that can be transferred to and from the player. The hard disk is dedicated to the storage of digital data and program files for use with the player. The portable device can include a player and hard disk that are selectively detachable from one another. Alternatively, the player and hard drive can include an integrated construction wherein the player and the hard disk are incorporated into a single housing, preferably having a single circuit, such as a printed circuit board (PCB). In the integrated portable device, the typical electronics for managing the data on a hard drive are preferably integrated with the recording, playing, or displaying electronics. In addition, certain electronic components may be shared by the hard disk controller and player electronics, thus further reducing the cost and size of the portable device. This creates a more tightly integrated solution that benefits from further power consumption reduction, lower cost and smaller size. Methods of playing, recording, and downloading data are also disclosed. Digital data stored on the hard disk can be transferred to a memory of the player for playback by the player device. Data can be recorded using the player and then transferred and stored on the hard disk. The hard disk can be coupled to an external communications device and digital data can be downloaded to the hard disk for later use on the player.

25 Claims, 8 Drawing Sheets

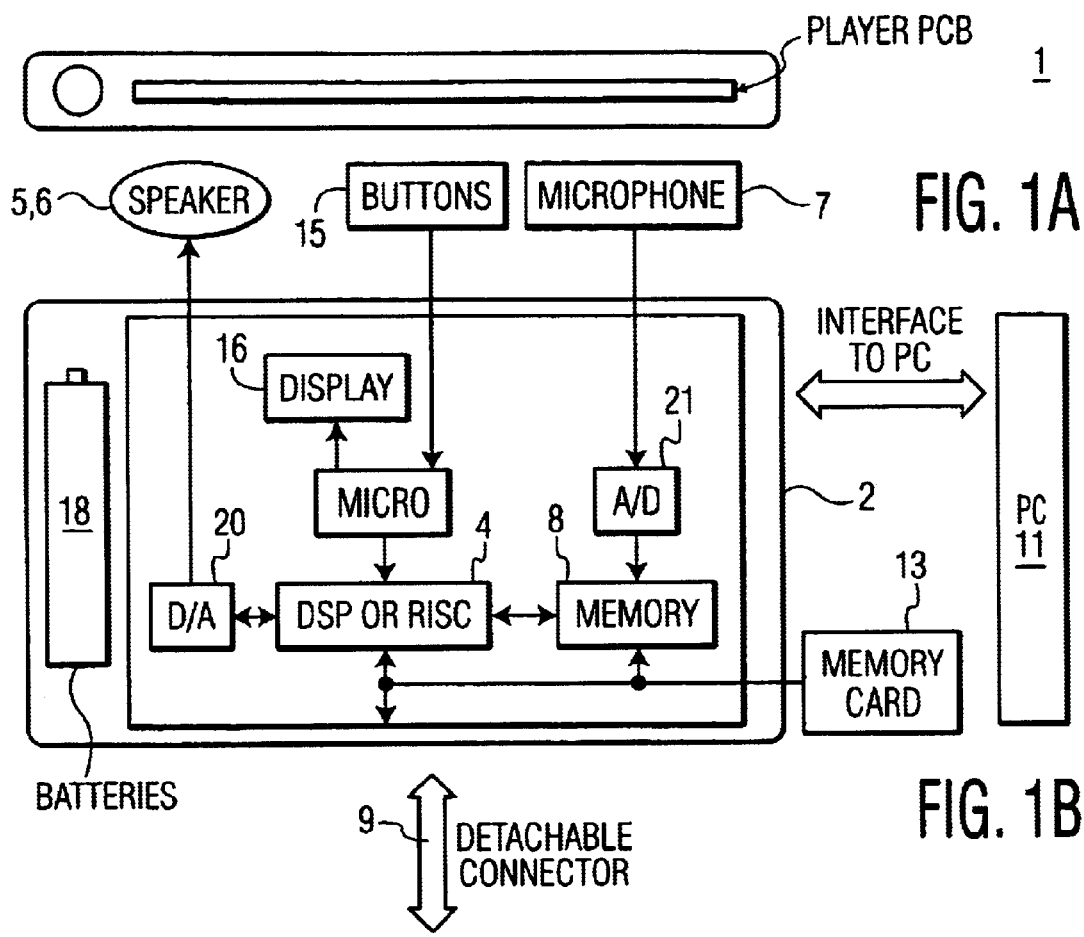
FIG. 1A
FIG. 1B
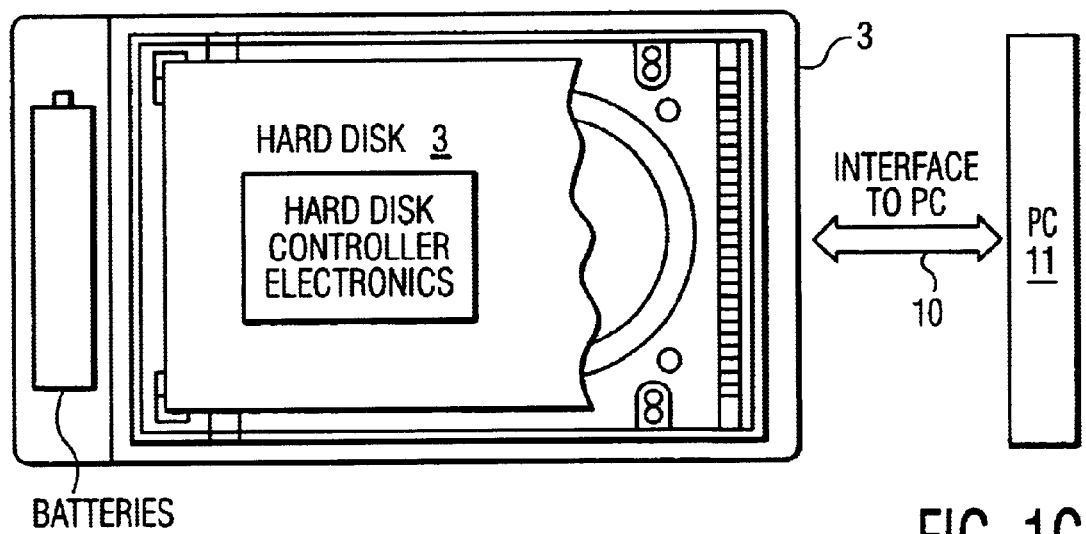
FIG. 1C
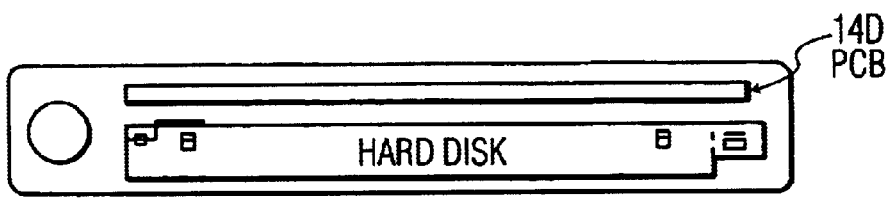
FIG. 1D

HARD DISK BASED PORTABLE DEVICE

RELATED APPLICATION DATA

The present application is a continuation-in-part application of U.S. patent application Ser. No. 09/409,531, filed Sep. 30, 1999, titled "Portable Audio Playback Unit," which relates to, and is entitled to the benefit of the filing date of, U.S. Provisional Patent Application Ser. No. 60/134,989, filed May 20, 1999, titled "Portable Audio Playback Unit" and U.S. Provisional Patent Application Ser. No. 60/129,003, filed Apr. 13, 1999, titled "Portable Audio Player."

FIELD OF THE INVENTION

The present invention relates in general to the field of portable digital devices, and in particular, to portable devices having very large requirements for storage capacity of data, such as audio/music devices, needed to play and record data, including audio, still images, video, text, and music.

BACKGROUND OF THE INVENTION

With the rapid growth of mobile computing and recent developments in digital data compression, digital devices, such as music/camera/video players and recorders, have the potential of becoming more popular. In the case of digital music players/recorders, these devices offer a better means of taking advantage of music offered on the Internet and are more resilient than drive systems having moving parts, such as CD players and MD players. In the case of digital cameras, such devices offer quick previews means with fast PC connectivity to communicate and store images. In the case of cellular phones, such devices offer a convenient means of capturing large amounts of data anywhere, anytime. In addition, as technology advances electronic devices are, in general, shrinking in size, and with them so are portable digital devices.

Unfortunately, high quality music or audio, images, and video require a large amount of digital memory. For example, even after an over 10-to-1 compression of PCM format, an hour of high quality digital music may still require 60 Megabytes of memory. In order to reduce power consumption of the portable devices most vendors typically use non-volatile memory, such as a FLASH type memory. However, this type of memory is relatively expensive and limited in capacity, and as a result no more than 128 megabytes are typically currently used. Clearly, this amount of onboard memory is not large enough to support a large library of digital data, such as text, audio, image, and video files. An average library of a typical music listener/collector today may require gigabytes of storage space.

In order to solve the storage problem, the portable devices rely, in many cases, on a hard disk of a Personal Computer (PC) for storing a large library of "records." As a result, these current devices are portable only as long as one is satisfied with very limited storage capacity for information, such as about an hour of music that has been downloaded from the hard disk of the PC to the onboard memory of the portable device, or a memory card provided with the device.

However, this limits the user to only about an hour of playtime and in order to download new digital data for use on the digital device, a PC having a hard drive with a library of "records" has to be readily available to download new records to the portable device. The problem is compounded with image data and even more so with video data.

Others have tried to solve the problem, for example, by using a mini-disk as a storage device for the library of "records." This proposed solution was also not very effective or portable in that one still needed to have access to or carry a portable mini-disk storage box instead of a PC. Also, the CD player was required to continuously operate during music playback. This may impact negatively on the portable device's power consumption and thus its play/record times. This approach has another significant disadvantage in that there are moving parts during data play/record time.

Some vendors integrate a micro-drive into the portable device in an attempt to solve the storage capacity crunch. Although the micro-drive may have a higher capacity than available non-volatile memory, it is still limited in storage capacity (e.g., typically limited to about 350 megabytes). In addition, it is orders of magnitude more expensive relative to other mass storage devices. Furthermore, like the mini-disk, the micro-drive is continuously active when the device is on and this, as was mentioned earlier, impacts negatively on the portable device's power consumption and performance characteristics in harsh environments (e.g., shock).

Accordingly, there is a need for a small size, low-cost and power efficient solution to the high capacity storage needed for the upcoming portable digital music or audio, camera, video, and cellular phone players, and the like. Similar needs are mirrored in other markets, such as personal digital assistants and electronic books. The solutions described herein are applicable in other markets in which a portable, battery operated, relatively low cost mass storage device is needed to store relatively large amounts of data.

SUMMARY OF THE INVENTION

The above described problems associated with prior art devices and techniques for storing large amount of digital data, including for example text, audio, images, and video files, onboard of a portable device, are overcome by the present invention. The present invention is directed to a portable device that utilizes a battery operated conventional hard disk as part of the portable device. The hard drive can be either an integral or a stand-alone part of the device.

According to one embodiment of the invention, the portable device includes a player and a hard disk (e.g., a disk drive including a hard disk storage medium). Preferably, both parts are small, battery operated and portable. The hard disk preferably has a storage capacity of several gigabytes of digital data (including multimedia data, such as text, audio, image, video and/or music data, as well as program files). The player will typically have electronics to play or display the digital data files, local non-volatile memory to store a limited amount of playtime data, and peripheral devices to record and play text, audio/music, still images, and/or video. The player can include, for example, a music playback device for playing and recording audio information, a digital photography camera for playing and recording still image photography information, a digital video camera for playing and recording video information, a cellular phone for playing and recording audio information, etc.

To improve the portability of the device, it can be designed as two independent parts including the hard drive unit and the player unit. This allows the player unit to be detached and carried separately from the hard drive unit once the player on-board memory has been loaded with data for a period of playtime. In this embodiment, the player device is far more durable and resilient to shock. Accordingly, the present invention provides all the advantages of a portable chip memory based device with the advantage of immediate and in-the-field access to large volumes of data.

In accordance with another aspect of the invention, the hard disk and the player form an integral portable device, preferably having player and disk drive electronics that are integrated on the same circuit substrate, such as a printed circuit board (PCB). The typical electronics for managing the data on a hard drive are integrated with the recording, playing or displaying electronics. In addition, certain electronic components may be shared by the hard disk controller and player electronics, thus further reducing the cost and size of the portable device. This creates a more tightly integrated solution that benefits from further power consumption reduction, lower cost and smaller size.

In some cases, the preferred requirements for managing the data on the hard drive can be relaxed if the application is only for audio, images, or video, since the file sizes are generally large and continuous over sectors of the memory. The hard disk electronic controller and electronic circuitry can be simplified and a smaller (and cheaper) chip having less cache memory can be used. Under such circumstances, the electronics can be simplified and further reduction can be achieved in power consumption and cost. Also, file descriptions, including for example header information, song titles, image descriptions, etc. can be uploaded from the hard disk to the non-volatile memory so that the user can review and select items for use on the player without accessing and running the hard disk.

A further embodiment within the scope of the present invention is directed to a method of playing digital data on a portable handheld device. The method of playing data on the portable handheld player includes storing digital data on a hard disk of a portable device as one or more data files, transferring the data files to a non-volatile memory of the player device, and processing the data on the non-volatile memory with digital electronics to produce digital signals. During the playback period, the disk can be detached, turned off, and/or placed in a locked state to both reduce power requirements and also the vulnerability to shock. In addition, the method of playing data can include retrieving the digital data to be stored on the hard disk from an external communications device that is coupled to the hard disk.

In another embodiment, the present invention includes a method of recording data on a portable handheld device. This method includes converting an analog (music/audio/image/video/text) signal to digital data, processing a digital bit-stream with digital electronics capable of processing the data to produce digital signals, and storing the digital data on the player's non-volatile memory or directly to the hard disk of the portable device as one or more files. In addition, the method of recording data on the portable handheld device can include retrieving the data to be converted from an external communications device coupled to the digital electronics.

In another embodiment, the present invention includes a method of downloading data to a portable handheld device having a dedicated hard drive and player. The method for downloading data includes coupling the portable handheld device to an external communications device, selecting one or more data and program files for download, downloading the selected data and program files from the external communications device to the portable device, and storing the downloaded data and program files in a disk storage medium of the hard disk of the portable device.

In another embodiment, file descriptions, such as the name of song titles or image descriptions, are collectively transferred to the non-volatile memory of the player. In this manner, the selection, organization, and other manipulations of the files can be accomplished without accessing and running the hard disk. Once the task is complete, the hard disk can be accessed and all the requirements implemented in a relatively short period of time.

Voice recordings can be attached to images to assist in the organization and retrieval of the images.

BRIEF DESCRIPTION OF THE INVENTION

The foregoing and other aspects of the present invention will become apparent from the following detailed description of the invention when considered in conjunction with the accompanying drawings. For the purpose of illustrating the invention, there is shown in the drawings embodiments that are presently preferred, it being understood, however, that the invention is not limited to the specific methods and instrumentalities disclosed. In the drawings:

FIG. 1 shows top and side views of an exemplary portable device having a detachable hard disk in accordance with the present invention;

DETAILED DESCRIPTION OF PREFERRED EMBODIMENTS

Figure 2A:
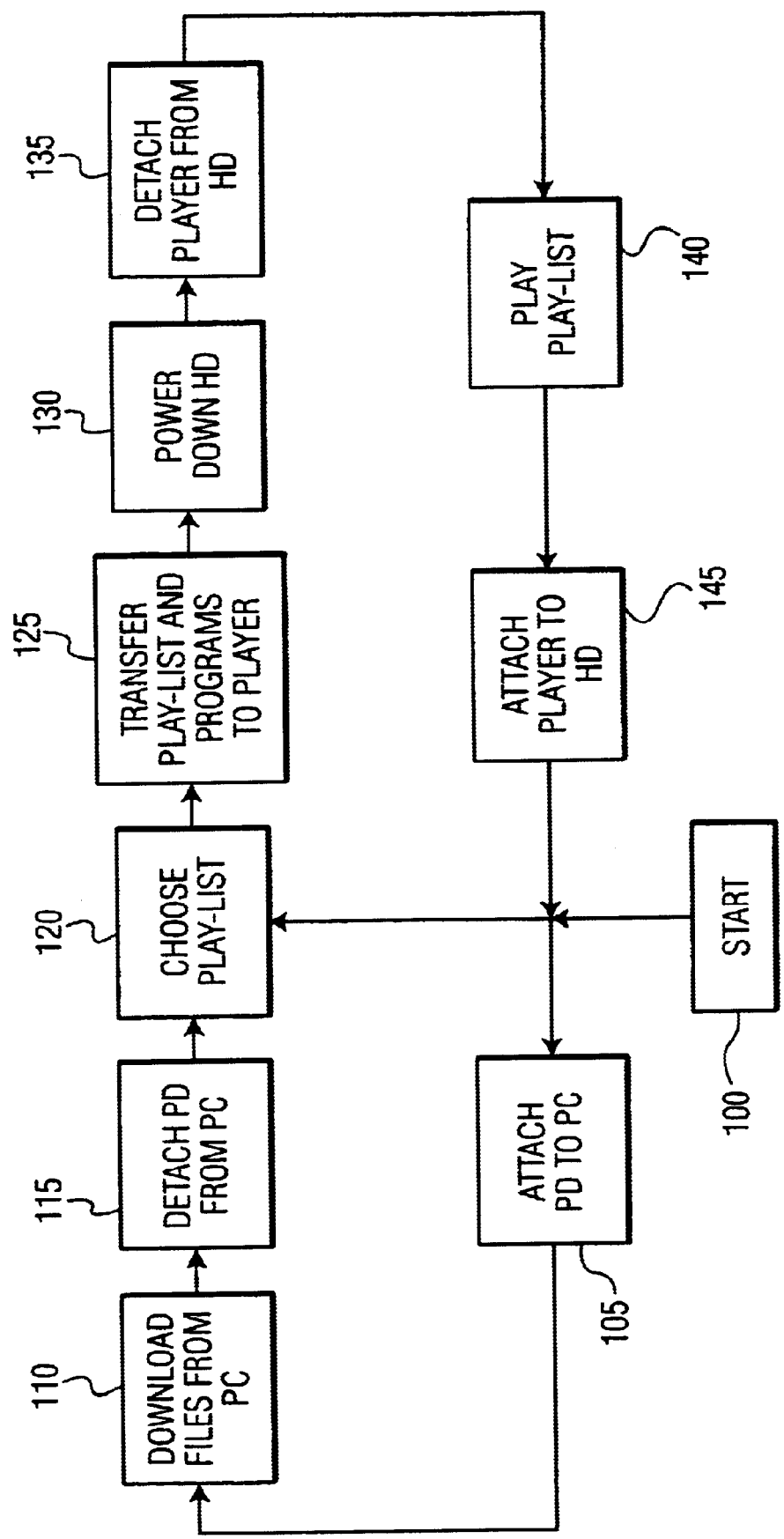
FIG. 2A is a high-level block diagram showing an exemplary data-flow for the device of FIG. 1 in accordance with the present invention.

The present invention is directed to a hard disk based portable handheld device that provides for storing relatively large amounts of digital data and/or program files on the portable device using the hard disk. The portable handheld device includes a player for playing/recording data, such as audio and music, and a hard disk (e.g., a disk drive including a hard disk storage medium) for storing relatively large amounts of data that can be used by the player. Preferably, the hard disk has a storage capacity of several gigabytes of digital data (including multimedia data, such as text, music, video and/or audio data, as well as program files). The present invention was developed in part to provide a small size, low-cost, and power efficient portable device having a high storage capacity.

The following section refers to FIGS. 1 and 2 in describing the embodiment of the invention in which the player and hard disk that form the portable device are selectively detachable from one another. FIGS. 3 and 4 are referred to in describing the embodiment in which the player and hard disk are integrated (e.g., not detachable) into a single housing of the portable device. Preferably, but not necessarily, the integrated portable device has a single substrate for supporting the player and hard disk controller electronics. The remaining sections of this detailed description refer to FIGS. 5 and 6 and relate to further details of the architecture of an exemplary portable device.

Portable Device With Detachable Hard Disk

FIG. 1 shows a high-level block diagram of the portable device according to one embodiment of the present invention. As shown in FIG. 1, the portable device 1 comprises two main parts, the portable player 2 and the hard drive 3. The processor 4 prepares the digital data, usually requiring a decompression process, for the D/A converter 20 on the player 2, which in turn converts the digital data from digital format into analog signals. Those signals can then be sent to earphones 5, or alternatively, connected directly to other stand-alone audio amplifiers 6 and external speakers. In the case of a camera or video, the processor 4 would be preparing the digital image for the digital to optical converter, which would finally be projected on a display.

In addition, an A/D converter 21 can convert the audio signal from a microphone 7 or other audio input and transfers the digitized signal to the processor 4. The digital data is preferably compressed in the processor 4 to reduce the memory requirements of the data. The digital data is stored on an onboard memory 8, preferably non-volatile memory, such as a FLASH-type memory.

Preferably, control buttons 15 on the portable device 1 allow for operation of the player 2 and its interface with the hard disk 3 via an interface 9, which can be a physical hard connector or a wireless interface. The portable device 1 can also have an interface 10 to allow data-file download/upload from an external communications device 11, such as a PC, to the portable device hard disk 3. Interface 10 can be a physical hard connector or a wireless interface. The portable device can also include an interface to, for example, a media card 13, which can be available as an additional or alternative on-board memory unit.

The hard disk 3 is preferably a PC style hard disk, such as an ATA-type hard drive. The dimensions and weight of such a hard drive 3 would be suitable for portable applications. The preferred dimensions would be approximately 110 mm×70 mm×10 mm and its weight approximately less than 100 g. These preferred dimensions currently represent the smallest hard disk available that has achieved the desired low cost per megabyte is this size. As new smaller drives having comparable, or smaller, size and cost become available they may be used with the present invention. Furthermore, like a conventional hard drive, the hard drive 3 is preferably capable of uploading and downloading data very rapidly (e.g., about 12 seconds for 32 megabytes of data), the limitation being the speed of the on-board memory. As a result it is possible to rapidly download hours or more of data, such as audio, to the player for playback. After the data has been downloaded, the hard disk can be detached and removed during playtime.

Referring to FIG. 1, the two main parts of the portable device 1 (e.g., the player 2 and hard disk 3) can be detachably connected (e.g., selectively attached and detached) with a special, easy to engage connector at interface 9, or alternatively a wireless type of interface, to facilitate the upload/download process. Preferably, the hard disk is an independent unit that is dedicated to storing data and programs for use by the player. In other words, the hard disk is not associated with another device external to the portable device, such as a general purpose computer. This type of arrangement is very attractive because it allows the user to detach the lighter player 2 from the independent, dedicated hard disk 3.

The hard drive 3 can also include a card slot (not shown) for inserting a memory card from another device. Data/files can then be transferred from the portable device to the memory card for use with the other device. Alternatively, data/files can be transferred from the memory card to the hard disk.

The hard disk 3 in the detachable embodiment includes a hard disk housing containing a disk storage medium for storing the digital data and the necessary electronic circuitry for controlling and operating the hard disk. The electronic circuitry is disposed on a circuit substrate and is selectively operatively coupled between the disk storage medium and one of the player and an external communications device for uploading and/or downloading data. The detachable hard disk has its own power source, and is preferably battery operated. The hard disk PCB, as shown in the top view of FIG. 1, is a partial cut-a-away view with the hard disk PCB partial cut-a-way for clarity and to show the location and relationship of the disk storage medium to the PCB.

The player includes a player housing having a solid state electronic memory for use in active playback and recording and has electronic circuitry disposed on a circuit substrate for transferring data between its memory and the hard disk. The player has an interface corresponding the hard disk interface for selectively attaching and detaching the player and the hard disk. The player has an onboard power source, such as a battery, and the battery-operated player 2 can play, for example, text, audio/music, image, and video files stored on its local memory.

Preferably, the portable device 1 also includes a high-speed interface 10, such as a high-speed connection, for coupling the portable device 1 to an external communications device 11, such as a PC, for downloading of digital data from an external source to the portable device. It can also allow a PC to do the hard-disk management. The hard disk 3 can be connected, for example, through an ATA™ interface and be controlled by a PC for programs, such as for example SCANDISK™, and other hard disk utilities'programs.

In some cases, the preferred requirements for managing the data on the hard drive can be relaxed if the application is only for audio, images, or video, since the file sizes are generally large and continuous over sectors of the memory. Under such circumstances, the electronics can be simplified and further reduction can be achieved in power consumption and cost. This is accomplished by not requiring the same amount of processing power to manage the memory of the hard disk. Accordingly, the hard disk electronic controller and electronic circuitry can be simplified and a smaller (and cheaper) chip having less cache memory can be used.

Figure 2B:
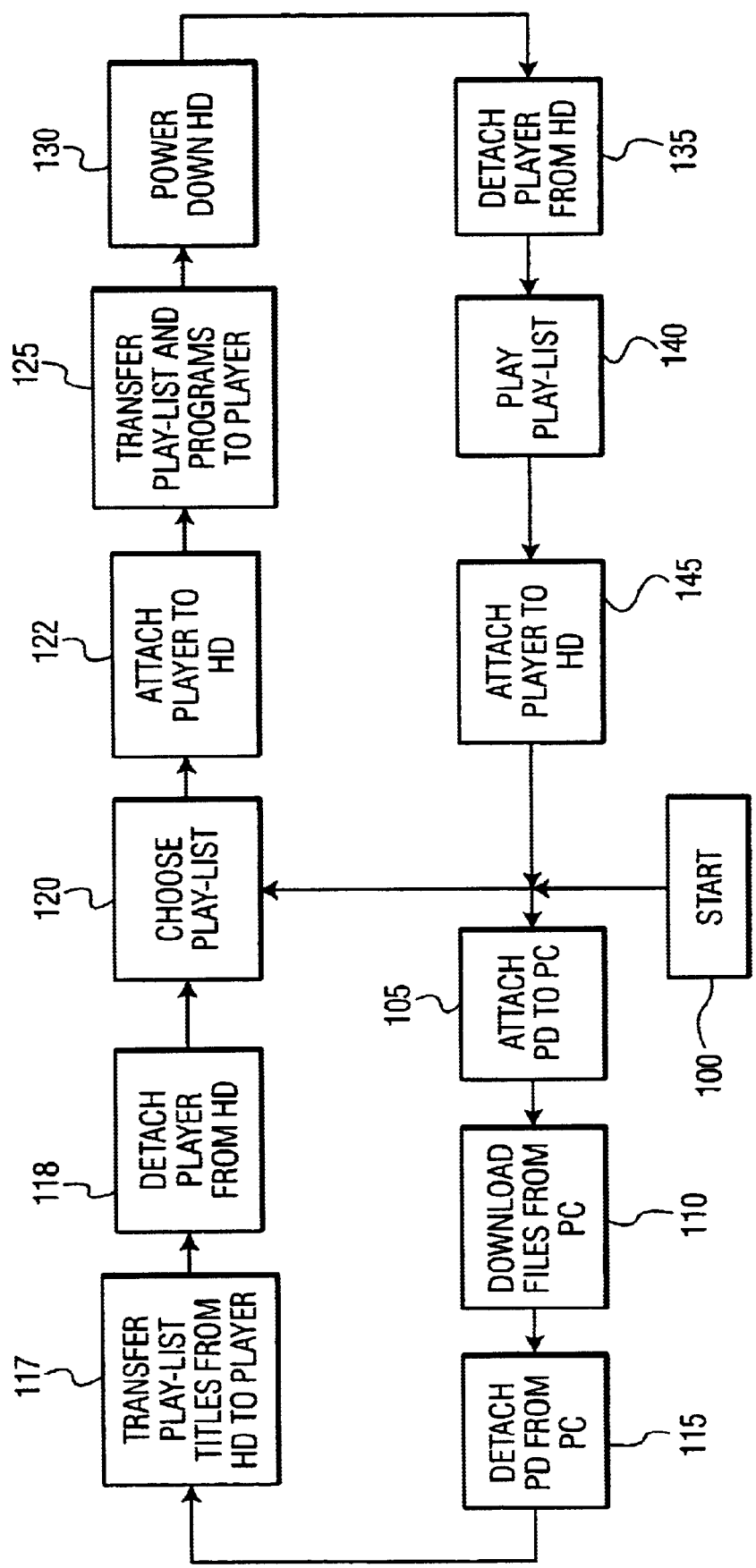
FIG. 2B is another high-level block diagram showing an exemplary data-flow for the device of FIG. 1.
Figure 3A:
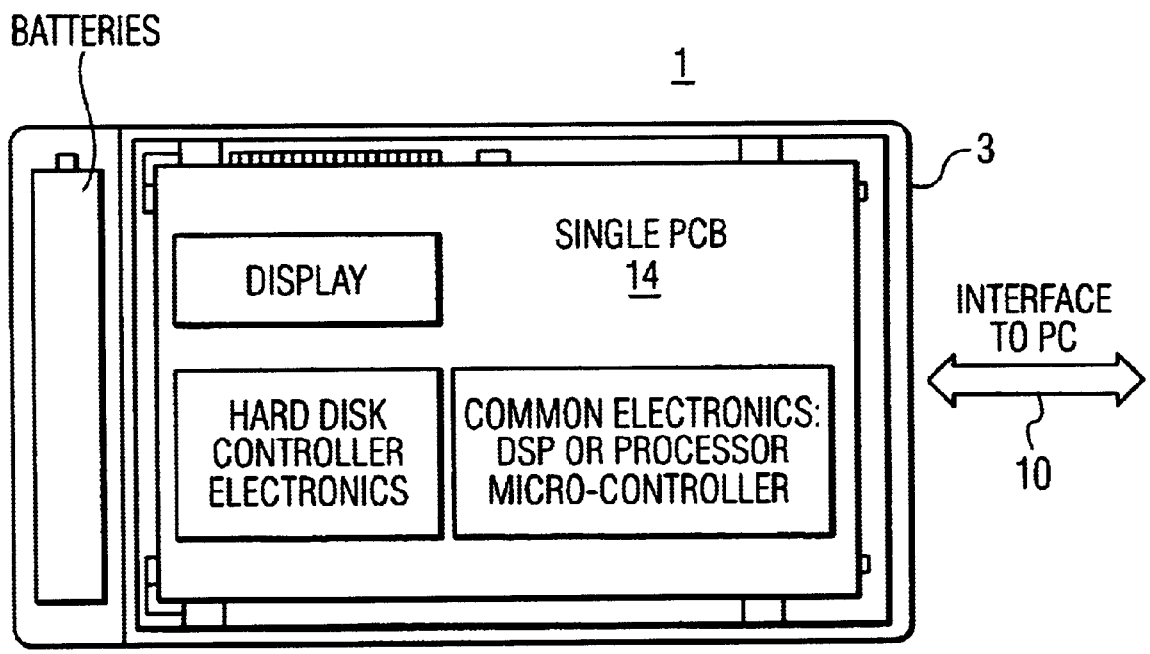
FIG. 3 is a top and side view of another exemplary portable device having an integrated hard disk in accordance with the present invention.
Figure 3B:
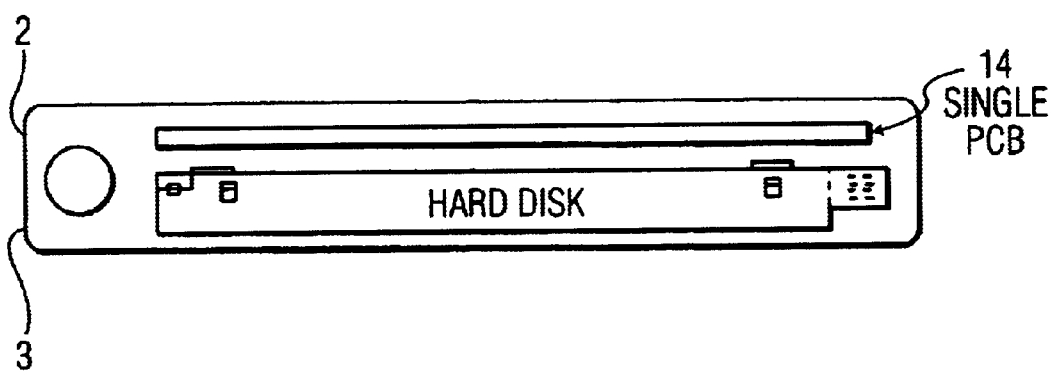

FIGS. 2A and 2B are flow-charts showing exemplary methods of operation for a portable device having a detachable hard disk in accordance with the present invention. As shown in FIG. 2A, the method includes activating the portable handheld device at step 100. Preferably, although not necessarily, the player and the hard disk are attached at the start of the process. Two options are then available to the user. The user can download data from an external device, or alternatively, the user can download data from the hard disk of the portable device.

In order to download data from an external device, the portable device is attached to an external communications device, such as a PC at step 105. Data and program files can be downloaded from the PC to the portable device at step 110. The data and program files can be downloaded to a solid state electronic memory of the player, or preferably, to a disk storage medium of the hard drive. If the portable device was connected to an external communications device, then the portable device is detach from the external communications device at step 115. This can include detaching a physical connection, such as a standard wired connection, between the portable device and the external communications device, or alternatively, terminating/disconnecting a wireless connection between the external device and the portable device. Alternatively, the user can download data directly from the hard disk, without accessing an external device.

The user chooses a play-list from the library of records stored on the hard disk of the portable device at step 120. The play-list and programs are transferred at step 125 from the hard disk to the player device. Preferably, this transfer includes the transfer of digital data from the disk storage medium of the hard disk to the FLASH memory or other memory of the player. Also, header information for the data and each data file can be uploaded from the hard disk to the non-volatile memory so that the user can review and select items for use on the player without accessing and running the hard disk. Preferably, data is transferable between the memory of the player and the disk storage medium of the hard disk. The hard disk is powered down at step 130.

The player is then detached from the hard disk at step 135. The user can use the player to play the play-list at step 140. When the user desires to modify or add to the current play-list, the user attaches the player to the hard disk at step 145. This includes physically re-attaching the player to the hard disk. Again, the user can either download data from an external device or directly from the hard disk of the portable device.

As shown in FIG. 2B, it is preferred that the file descriptions, such as the name of song titles or image descriptions, be collectively transferred from the hard disk to the non-volatile memory of the player. Accordingly, step 117 is added to the process shown in FIG. 2A and the file descriptions, such as the play-list titles, are transferred from the hard disk to the on-board memory of the player. The hard disk is then detached from the player at step 118 and the user can review and select a play-list at step 120. After a play-list is chosen, the player is attached to the hard disk at step 122 and the play-list is transferred from the hard disk to the player at step 125. In this manner, the selection, organization, and other manipulations of the files can be accomplished without accessing and running the hard disk. Once these tasks are complete, the hard disk can be accessed and all the requirements implemented in a relatively short period of time. The hard disk can then be powered down at step 130, detached from the player at step 135 and the play-list can be played at step 140.

Portable Device With Integral Hard Disk

FIG. 3 shows another embodiment of the present invention wherein the portable device has an integrated hard disk. Referring to FIG. 3, the portable device's two main elements, the player 2 and the hard disk 3, are integrated into the same housing of the portable device (e.g., the portable device has a single housing and the player and the hard disk are not detachable). Preferably, but not necessarily, the integrated portable device has a single substrate for supporting the player and hard disk controller electronics. Thus the hard-disk controller, the player's electronics and memory are built on the same board 14. This allows a higher level of integration that leads to lower cost and a smaller portable device 1. In this configuration as well, the hard disk 3 can include an interface 10 for connecting the hard disk 3 directly to a PC (not shown) for data down-up loads and for other disk management utilities. Preferably, the player and the hard disk share common electronics, such as for example, a DSP, a memory, a micro-controller, etc.

The preferred single circuit substrate includes a solid state electronic memory for use in active playback and recording, wherein data, such as audio information, is transferred from the hard disk to the memory and then the hard disk is deactivated or placed in a locked state. Electronic circuitry for the player and the hard disk is selectively operatively coupled between the disk storage medium and either the player or an external communications device for uploading/downloading digital data between the hard disk and either the player or the external communications device. In addition, the electronic circuitry is selectively operatively coupled between the hard disk and the memory for playback of data, such as audio information, from the memory. At least one power source is provided in the housing for providing power to the player, the hard disk, and the electronic circuitry for operating the portable device.

In this embodiment having an integrated player and hard drive, the hard drive is preferably deactivated and/or placed in a locked state once the data has been transferred from the hard disk to the player memory (e.g., the hard disk is locked or turned off prior to and during playtime). The portable handheld device can include a deactivation mechanism for selectively turning off or locking the hard disk during playtime and allowing the hard disk to operate again when read/write access is required.

Figure 4A:
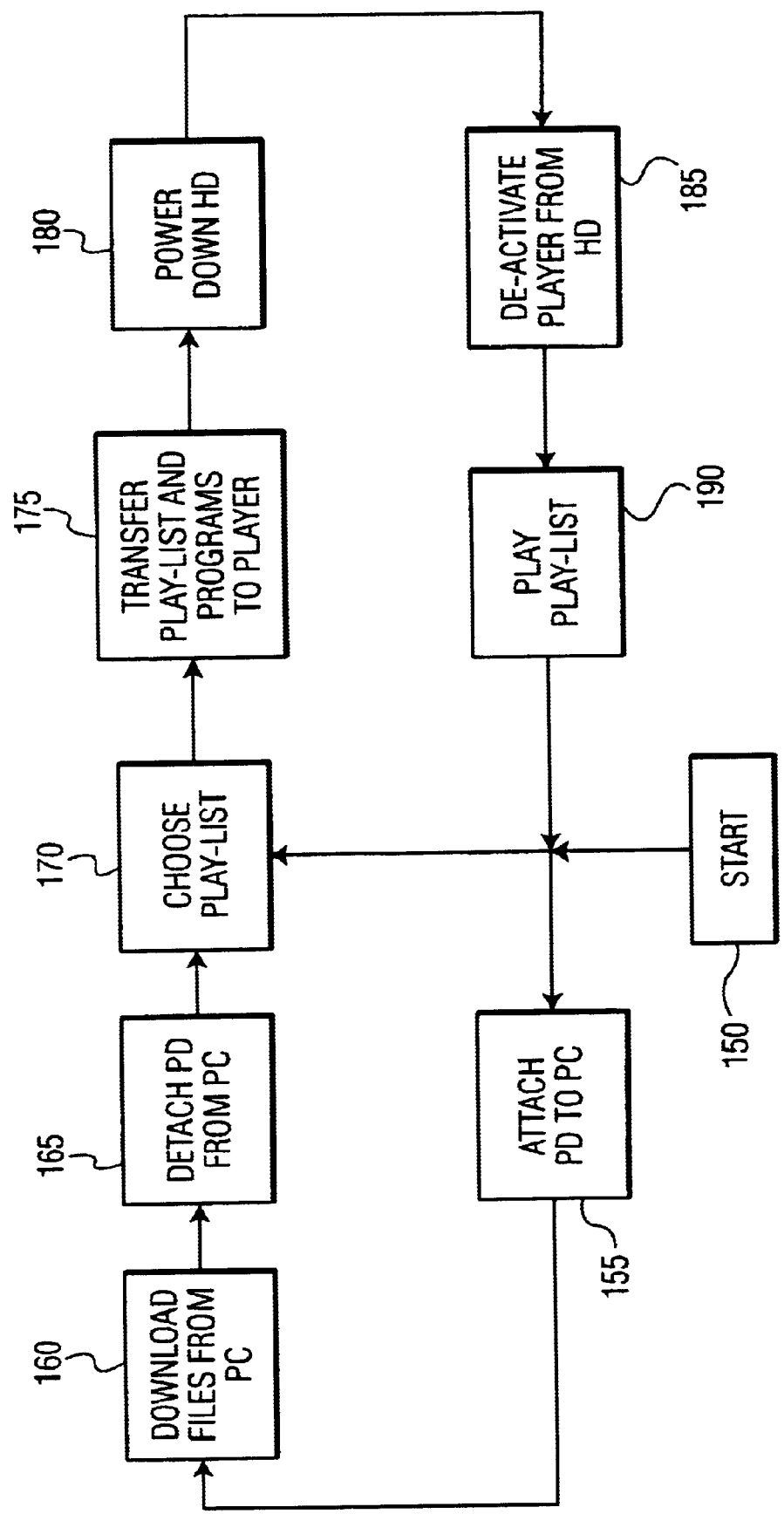
FIG. 4A is a high-level block diagram showing an exemplary data-flow for the device of FIG. 3 in accordance with the present invention.
Figure 4B:
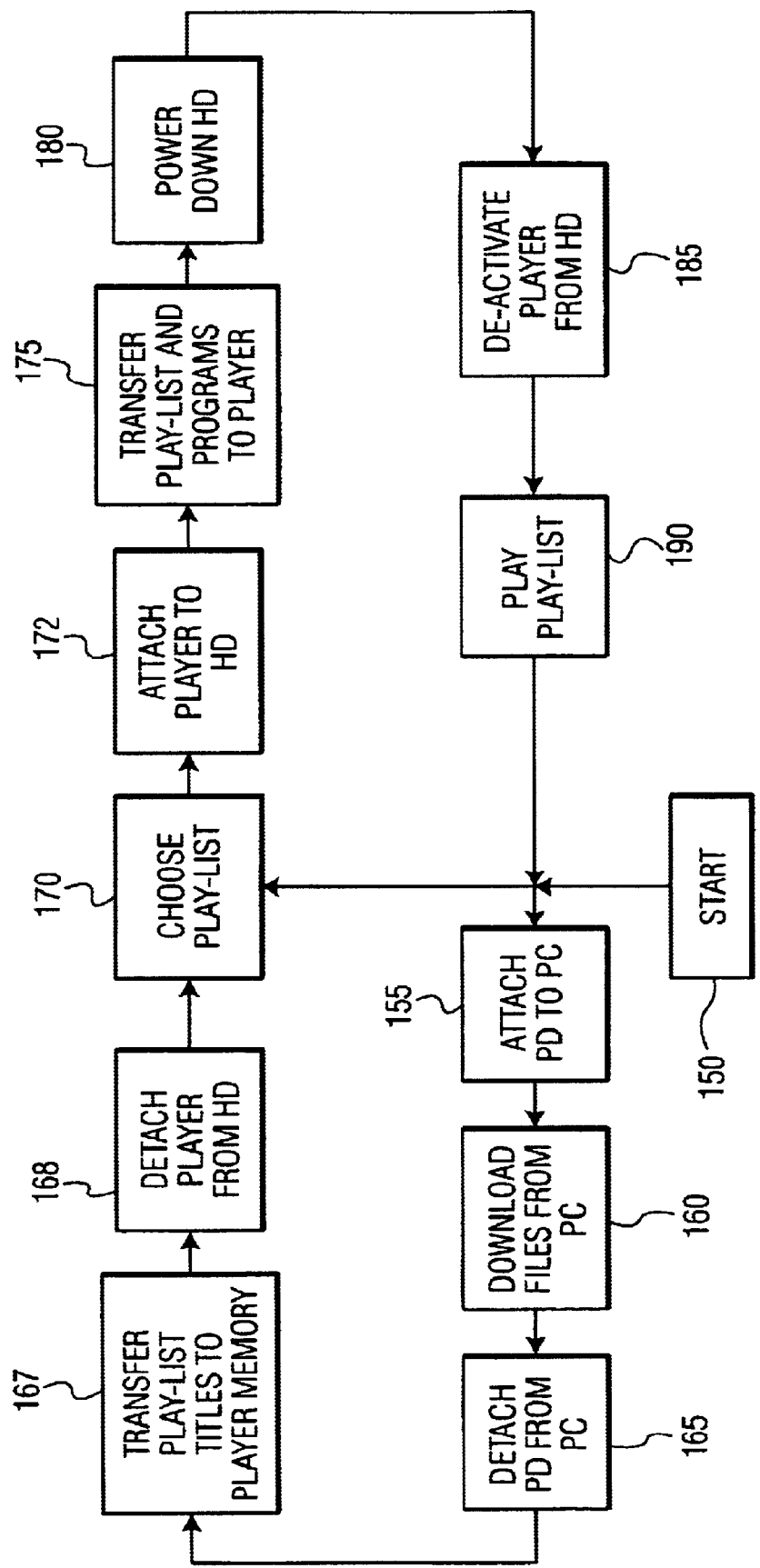
FIG. 4B is another high-level block diagram showing an exemplary data-flow for the device of FIG. 3.

FIGS. 4A and 4B are a flowcharts showing a method of operation for the exemplary portable device of FIG. 3 having an integral hard disk and player. As shown in FIG. 4A, the method includes activating the portable handheld device at step 150. Two options are again available to a user, the user can download data from and external device to the portable device at step 160, or alternatively, the user can transfer data from the hard disk of the portable device to the memory of the player at step 170.

To download data from an external source, the portable device is attached or coupled to an external communications device, such as a PC, at step 155. Data and program files can be downloaded from the external communications device to the portable device at step 160. The data and program files are downloaded the disk storage medium of the hard drive. After downloading the data, the portable device is detached from the external communications device at step 165. This can include detaching a physical connection, such as a standard wired connection, or alternatively, terminating a wireless connection between the portable device and the external communications device.

The user can choose a play-list from the library of records stored on the hard disk of the portable device at step 170. Note that the user does not have to download data from an external source prior to choosing the play-list. The play-list and programs are transferred at step 175 from the hard disk to the player device. Preferably, this transfer includes the transfer of digital data from the disk storage medium of the hard disk to the FLASH memory or other memory of the player. In addition to data relating to the play-list, header information for the data and each data file can also be uploaded from the hard disk to the non-volatile memory so that the user can review and select items for use on the player without accessing and running the hard disk. The hard disk is powered down at step 180.

The hard disk is locked/de-activated (e.g., turns power off) at step 185 such that it does not operate during playtime. The user can use the player to play the play-list at step 190. When the user desires to modify or add to the current play-list, the user unlocks/re-activates (e.g., turns power on) the hard disk.

The user can choose a new or modified play-list from the library of records stored in the disk storage medium of the hard disk at step 170. Alternatively, the user can attach the portable device to an external communications device at step 155 and then download data and program files from the external communications device to the portable device at step 160.

As shown in FIG. 4B, it is preferred that the file descriptions, such as the name of song titles or image descriptions, be collectively transferred from the hard disk to the non-volatile memory of the player. Accordingly, step 167 is added to the process shown in FIG. 4A and the file descriptions, such as the play-list titles, are transferred from the hard disk to the on-board memory of the player. The hard disk is then de-activated (e.g., turned off or placed in a locked state) from the player at step 168 and the user can review and select a play-list at step 170. After a play-list is chosen, the player is re-activated (e.g., turned on or unlocked) to the hard disk at step 172 and the play-list is transferred from the hard disk to the player at step 175. In this manner, the selection, organization, and other manipulations of the files can be accomplished without accessing and running the hard disk. Once the task is complete, the hard disk can be accessed and all the requirements implemented in a relatively short period of time. The hard disk can then be powered down at step 180, de-activate/locked from the player at step 185, and the play-list can be played at step 190.

An exemplary process for playing digital data and program files on the exemplary portable devices of FIGS. 1 and 3 includes:

(a) Downloading data and files that are needed to operate the portable device 1 from an external communications device 11 to the hard disk 3. The data and files can be downloaded using any standard download technique and can be accomplished wirelessly, or wired directly to the external communications device 11 that is coupled to a server having stored data and program files. The external communications device 11 can include, for example, a host computer, a cable set-top box, the Internet, an Intranet, a modem, etc. In some instances an IDE connection to a PC may be advantageous since the PC views the device as a standard hard drive thereby making file transfers very simple and fast.
  (b) Downloading selected files and programs from the hard disk 3 to the player's onboard memory 8.
  (c) Processing the data files with the dedicated processor 4 and electronics on the player 2 to create analog audio/music signals and directing them to one or more of the earphone/speaker 5,6 output.

An exemplary recording process is generally the converse of the playing process, and includes:

(a) Digitizing an analog signal with an electric circuit.
  (b) Processing the digitized data using the dedicated processor 4 and electronics and temporarily storing the processed data on the onboard memory 8.
  (c) Uploading the stored data to the portable device hard disk 3 for permanent storage.

An exemplary method of downloading data to the portable handheld device having a dedicated hard drive and player includes:

(a) Coupling the portable handheld device 1 to an external communications device 11.
  (b) Selecting one or more data and program files for download.
  (c) Downloading the selected data and program files from the external communications device to the portable device.
  (d) Storing the downloaded data and program files in a disk storage medium of the hard disk of the portable device.

During the download process, it is possible to download part of each data file into the player memory. The download process can also include downloading/uploading data and/or program files between the hard disk and the onboard memory during one of data playing and data recording. In addition, the method can also include downloading/uploading data and/or files between the hard disk and the external communications device during one of data playing and data recording.

The use of the hard disk with a portable device and the described method of operation provide for the following important advantages:

1. Lowest onboard per byte storage cost among all current mass storage devices.
  2. Power consumption is minimized because hard-drive operation is not needed during play/record times. During continuous operation the hard disk typically draws about 300 milli-amperes and during initialization it draws about 2 amperes. As a result 2 AA batteries can support more than 150 half-hours of uploads or downloads to the onboard non-volatile memory.
  3. There are no moving parts during playtime. So there is no need to over-protect the device from vibration and shock that may cause skips.

Architecture of Portable Handheld Player

The player can include, for example, a music playback device for playing and recording audio information, a digital photography camera for playing and recording photography information, a digital video camera for playing and recording video information, a cellular phone for playing and recording audio information, etc. The below description related to an exemplary portable handheld audio playback unit for playing and recording of music and audio data. Other devices that can comprise the player include standard devices and therefore are not described in detail because they are well known in the art.

In one exemplary embodiment of the present invention, the portable handheld device is a Portable Audio Playback Unit, in which audio content can be written, stored, retrieved, and played. In addition, the unit can intelligently interact with the user, displaying non-audio information, accepting input from the user through a keyboard interface, and collecting statistics on the unit's usage.

Figure 5:
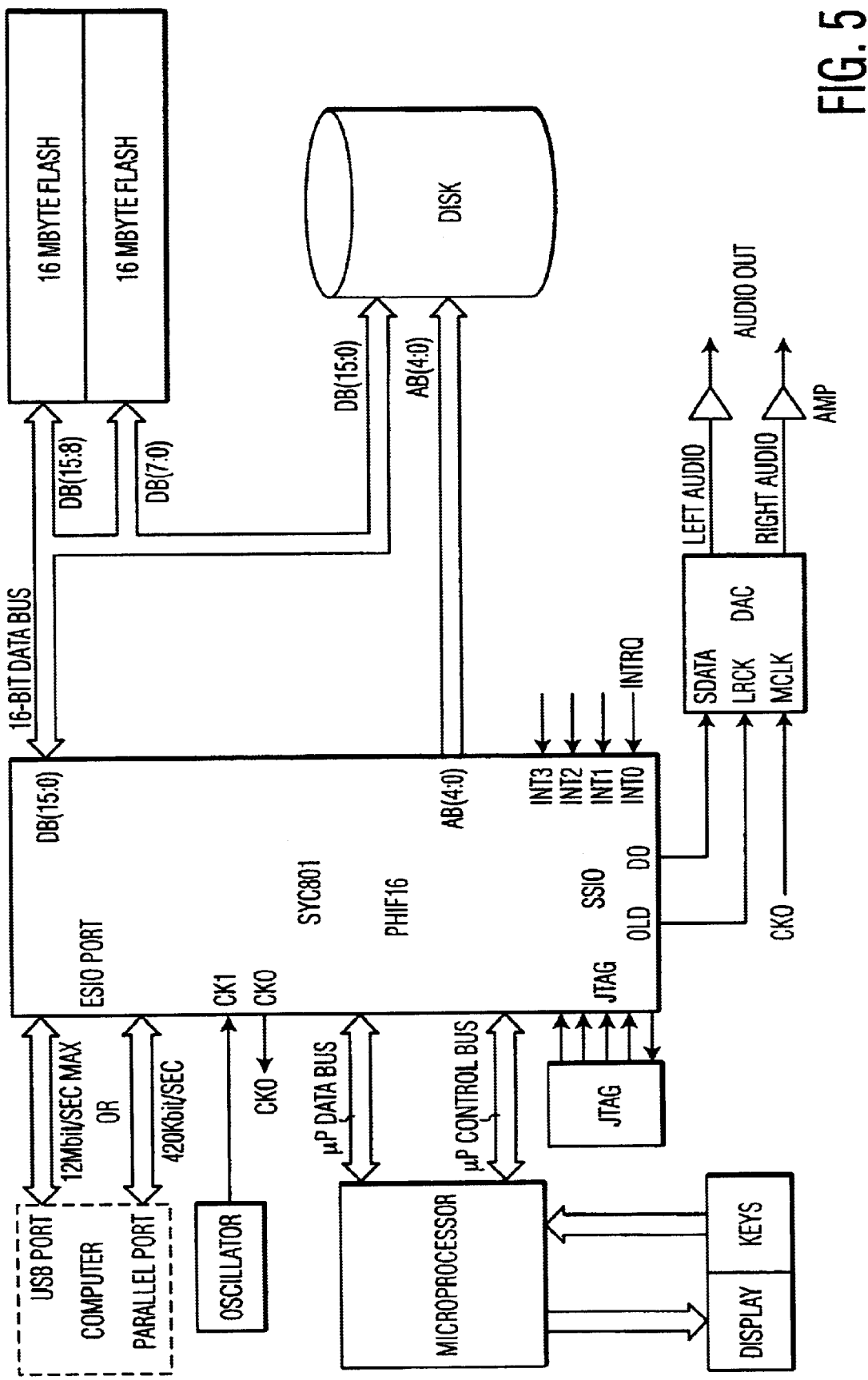
FIG. 5 is a block diagram showing the exemplary player device of FIGS. 1 and 3.
Figure 6:
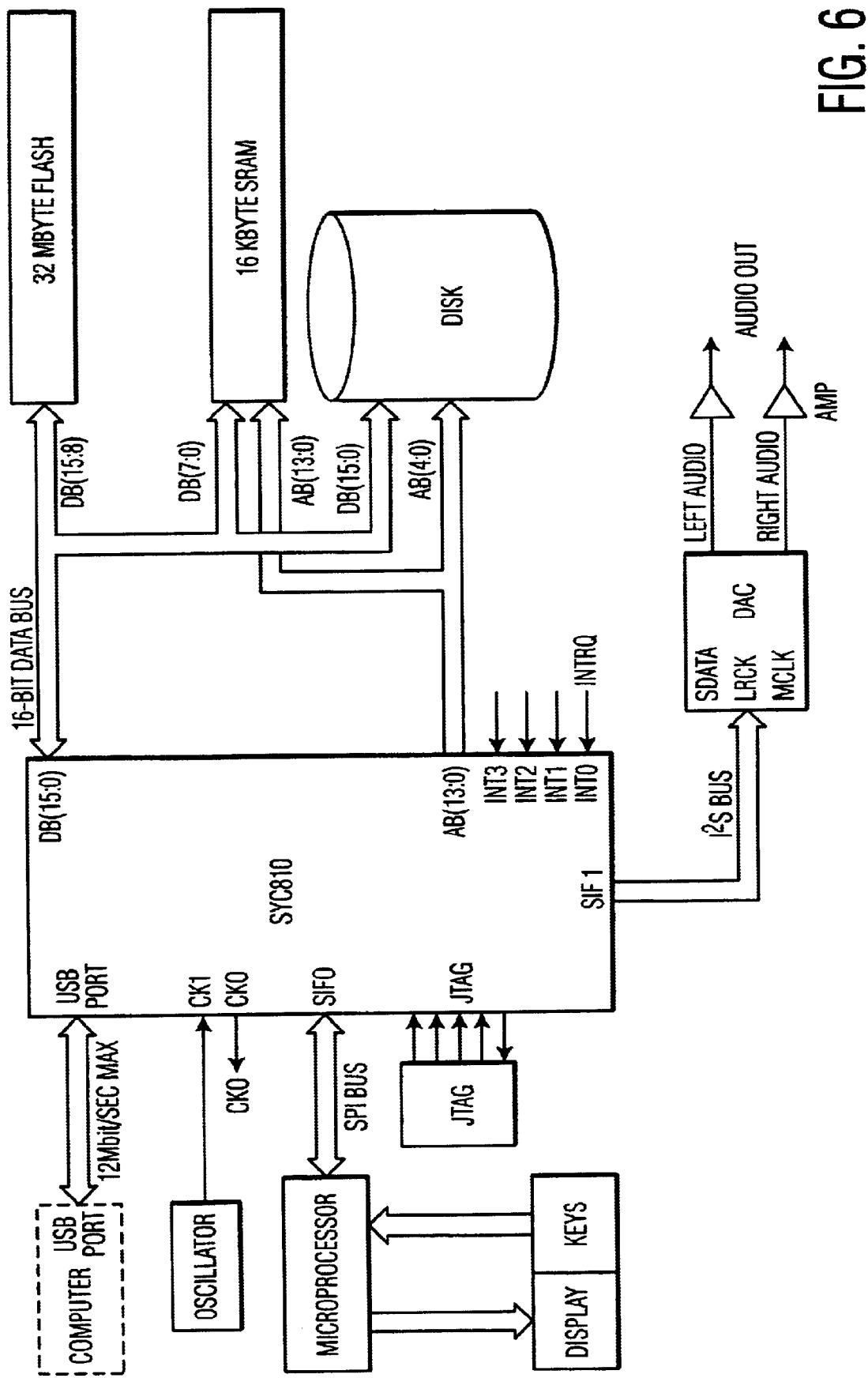
FIG. 6 is a block diagram showing another exemplary player device.

FIGS. 5 and 6 depict alternative exemplary embodiments of the portable device. The significant difference between the two embodiments is that one employs a Static Random Access Memory (SRAM), while the other does not. This, and other differences, are a matter of economics and availability of devices, and do not affect the overall function of the unit. Accordingly, the descriptions that follow relate to either block diagram as appropriate.

One particularly important aspect of the present invention is the use of a hard drive (such as the kind typically used in a laptop or notebook computer), which is a delicate and high power consuming device. Therefore, to use a hard drive in a portable, hand-held audio player, it was necessary to find a way to both protect and reduce the power consumption of the hard drive.

In particular, the hard drive is subject to breakage if operated while the device is not stationary. This poses a significant problem for a portable, typically hand-held, device. In the present invention, the ease of breakage was dealt with in two ways: First, a careful mechanical study was conducted to find the thickness of a reasonably available absorption material needed to be used to pass a 1 meter drop test. It was discovered that about 0.8 inches of such material was sufficient to protect the hard drive. Second, a secondary stationary memory concept was used as the active system during playback or recording. Here, the hard drive uploads an hour or so of material to the solid state memory and locks the drive. This process takes about 7 seconds. Thus, the disk medium is normally locked, especially while the unit is being carried about by the user.

The aforementioned power consumption problem was solved using the secondary memory as well, since the drive only needs to spin momentarily.

The various components of the exemplary portable devices shown in FIGS. 5 and 6 will now be described.

Communications Device

This device is external to the subject portable audio device, and is shown for clarity and completeness. When the portable handheld audio device is attached to the communications device, such as for example a computer, communication between the two can be achieved. Such communication may be done via a parallel port, a serial port, ATA bus, or any other convenient means. Through this port, digital data, including both audio and non-audio content, can be downloaded to the portable handheld audio device, and device usage statistics can be uploaded. If the portable handheld audio device is used as a recorder, this port can be used to upload the recorded content to the computer. Alternatively, the communications device can include a set-top box, a personal computer, a wireless modem link, a direct modem link, etc.

SYC801/SYC810

The components labeled SYC801 and SYC810 in FIGS. 5 and 6 are each a Digital Signal Processor (DSP) (although the invention may employ any suitable type, not only those types explicitly shown), in which the major program for the overall operation of the portable handheld audio device executes. The functions of this program are manifold, and include communication with the computer, reading/writing data from/to the Flash and Disk memories, compressing and decompressing audio data, and communicating with the microprocessor and computer.

OSC

This Oscillator supplies the clock necessary for the operation of the DSP, and may be set at any convenient frequency, not just the 12.2880 MHz explicitly shown.

Microprocessor/Display/Keys/Buttons

The microprocessor executes a program that interprets key depressions from the user, and provides visual feedback and prompts on the display. In addition, the microprocessor program contains a clock function, by which messages and prompts keyed to date and/or time can be activated without burdening the DSP, since the DSP typically requires more power for this function.

Flash Memory

Flash memory is a non-volatile storage medium. Audio data can be loaded into Flash memory and the power subsequently removed to conserve energy. When the audio data is needed, power can be restored, and the data quickly accessed. Note that the secondary memory is not limited to Flash memory, as SRAM, DRAM and other types of solid state memory may also be used.

Hard Drive

Disk memory is another non-volatile storage medium. It is economical to store vast quantities of audio data on the Disk, ready for transfer to the Flash memory for quick processing as directed by the DSP.

As discussed above, an important aspect of the present invention is the use of a hard drive (such as the kind typically used in a laptop or notebook computer), which is a delicate and high power consuming device. Therefore, to use a hard drive in a portable, hand-held audio player, the hard drive must be protected and its power consumption must be reduced. In accordance with the present invention, the hard drive may be subject to breakage if operated while the device is not stationary. This poses a significant problem for a portable, typically hand-held, device. This is one reason why hard drives have never been used for portable devices. Another reason is because they were not built for that purpose. However, hard drives have one clear advantage over other media in that they are very mature technology and therefore have ridden far down the price performance curve. In the present invention, the ease of breakage was dealt with in two ways. First, a careful mechanical study was conducted to find the thickness of a reasonably available absorption material needed to be used to pass a 1 meter drop test. It was discovered that 0.8 inches of such material is sufficient to protect the hard drive. Second, a secondary stationary memory concept was devised to be used as the active system during playback or recording. Here, the hard drive uploads an hour or so of material to the solid state memory and locks the drive. This process takes about 7 seconds. Thus, the disk medium is normally locked, especially while the unit is being carried about by the user.

With regard to the absorption material, it should be noted that we have not yet identified the best material to use. We have determined that the properties for such a material are to absorb a high impact and also to provide a loose enough motion for normal motion. It is analogous to a car wheel suspension system but more complicated since it needs to perform 360 degrees. In a car, one needs to prevent damage from high impact and also to have a smooth ride over small bumps. These are competing constraints. There are many materials that may provide this but none have been selected yet. It may end up being a combination of a few. The measurements we performed were to define that deceleration needed to prevent the hard drive from breaking. This in turn allows for the definition of the types of materials we need.

Also, the playback unit can be designed so that the hard drive can be disconnected from the playback unit. Accordingly, the unit can operate independently in case the user wants to use the device in a particularly harsh environment or to reduce the weight and size of the product for easier mobility.

The hard drive can interface with an external communications device, such as a personal computer (PC), in a number of ways, including for example: (1) through an IDE interface that is very fast and acts as an external drive for the PC; (2) through a USB (Universal Serial Bus) interface; and (3) through a parallel port interface. Other means of communication are also possible.

Other advantages of using a hard drive include:

- The hard drive can be changeable to upgrades in memory size as the densities grow.
- The volume of audio for the cost of the unit it the biggest novelty, using a mature technology, hard drive, for the purpose of providing an abundance of audio.
- Compression algorithms, such as MP3, are used to maximize the amount of audio for the amount of memory (typically, 100 kbit per minute) at CD-like quality.
- We propose to use the 2.5" laptop-type drive since it is inexpensive and designed for relative durability. However, smaller drives may make more sense in the future.
- The present invention is also advantageous in high volume recording applications. One issue with portable digital recorders is that memory is expensive, and so time is relatively limited. The use of a high capacity hard drive remedies this problem.

The present invention may also be expanded to video and digital cameras.

The algorithms can be loaded from the hard drive to offer different algorithms in the future.

SRAM

It may be convenient and economical to store some of the DSP's program external to the DSP itself. This Static Random Access Memory is intended for that purpose, although DRAM may also be used.

DAC

Audio data, after being decompressed or otherwise manipulated by the DSP, is presented to this Digital-to-Analog Converter (DAC). The digital data, in conjunction with various clocking signals, is converted to a smoothly-varying analog signal representative of the intended sound. In addition, separation of Left and Right Audio signals takes place within the DAC.

AMP

The audio signal is Amplified to a level suitable for speakers or headphones.

Other Applications

Audio can be downloaded from the Internet, stripped from personal CDs (compact disks) and loaded into the hard drive, and/or recorded and ported to the hard drive. In addition, a wireless interface to the unit can offer a way to transfer audio/video (AV) information.

The inventive device may also be used in an automobile. For example, the unit can be built into an auto panel system and audio can be ported to the unit in a number of ways: (1) audio can be loaded onto the unit's hard drive by a portable PC; (2) the hard drive can be removed and interfaced to a PC for loading of the audio; (3) the audio can be recorded from the automobile's radio; and/or (4) dictation can be taken in the car using a microphone.

Although illustrated and described herein with reference to certain specific embodiments, it will be understood by those skilled in the art that the invention is not limited to the embodiments specifically disclosed herein. Those skilled in the art also will appreciate that many other variations of the specific embodiments described herein are intended to be within the scope of the invention as defined by the following claims.

What is claimed is:

1. A portable handheld device comprising:
    a player capable of recording and playing digital data; and
    a hard disk removably coupled to said player for storing said digital data, said hard disk being configured to transfer data from said hard disk to said player, wherein said hard disk is not associated with a general purpose computer; and
    wherein said player is configured to allow the data transferred from the hard disk to be selected and to play the selected transferred data when the hard disk is not coupled to the player.

2. The portable handheld device of claim 1, wherein said hard disk further comprises an interface connection, said interface connection communicating with an external communications device to allow data and file download/upload between said hard disk and said external communications device.

3. The portable handheld device of claim 1, wherein said hard disk further comprises
    a hard disk housing;
    a disk storage medium disposed in said hard disk housing for storing digital data;
    electronic circuitry disposed on a circuit substrate in said hard disk housing, for uploading/downloading digital data between said hard disk and one of said player and/or an external communications device;
    an interface in said hard disk housing for detachably connecting said hard disk to said player; and
    a power source disposed in said hard disk housing, said power source being coupled to said electronic circuitry for operating said hard disk.

4. The portable handheld device of claim 3, wherein said power source comprises a battery.

5. The portable handheld device of claim 1, wherein said player further comprises:
    a player housing;
    a solid state electronic memory disposed in said player housing for use in active playback and recording, wherein said data is transferable either from said hard disk to said memory or between said hard disk and said memory before said hard disk is detached form said player;
    electronic circuitry disposed on a circuit substrate disposed in said player housing, for playback of said data from said memory;
    an interface in said player housing for detachably connecting said player to said hard disk; and
    a power source disposed in said player housing, said power source being coupled to said electronic circuitry for operating said player.

6. The portable handheld device of claim 5, wherein said power source comprises a battery.

7. The portable handheld device of claim 1, wherein said hard disk can be coupled to an external device for data and hard disk management.

8. The portable handheld device of claim 1, wherein said player is a music player and said data comprises audio information.

9. The portable handheld device of claim 1, wherein said player is a digital photography camera and said data comprises digital optical image information.

10. The portable handheld device of claim 1, wherein said player is a digital video camera and said data comprises digital video information.

11. The portable handheld device of claim 1, wherein said player is a cellular phone and said data comprises audio information.

12. The portable handheld device of claim 1, wherein said files have file sizes that are generally large and continuous over sectors of memory thereby requiring less processing power to manage said memory of said hard disk, and wherein said hard disk electronics are simplified and said hard disk electronic controller comprises a smaller chip having less cache memory.

13. The portable handheld device of claim 1, wherein file descriptions are collectively transferable to said non-volatile memory of said player, and wherein one or more of a selection, an organization, and other manipulations of said files can be accomplished without accessing and running said hard disk.

14. The portable handheld device of claim 13, wherein once said selection, organization, and other manipulations of said files is complete, said hard disk can be accessed and said selected files can be transferred in a relatively short period of time.

15. The portable handheld device of claim 1, wherein voice recordings can be attached to said data to assist in organization and retrieval of said data.

16. The portable handheld device of claim 1, further comprising a card slot formed in said portable device and coupled to said portable device electronics, said card slot constructed to receive a memory card that can be inserted into said card slot for transferring data between said portable device and said memory card.

17. A method of playing digital data on a portable handheld device having a dedicated hard disk and player comprising:

storing digital data on said hard disk of said portable device as one or more data files;

allowing a portion of the digital data on said hard disk to be selected for transfer to said player device;

transferring only said selected data filed to a non-volatile memory of said player device;

detaching the hard disk from the portable device; and processing said selected data in said non-volatile memory with digital electronics to produce digital signals when the hard disk is detached from the portable device.

18. The method of claim 17, further comprising storing programs used to play said digital data on said hard disk.

19. The method of claim 18, wherein said programs are used to play one of compressed and uncompressed data.

20. The method of claim 17, further comprising uploading file header information for said data to said non-volatile memory for use in reviewing and selecting items from said player memory.

21. The method of claim 17, wherein said hard disk is used as a general-purpose storage device.

22. The method of claim 17, further comprising retrieving said digital data to be stored on said hard disk from an external communications device coupled to said hard disk.

23. The method of claim 17, further comprising disconnecting power to said hard disk when said hard disk is not in use.

24. The method of claim 17, further comprising placing said hard disk in a locked state during playtime and unlocking said hard disk when read/write access is required.

25. A method of downloading data to a portable handheld device having a detachable hard drive and player comprising:

coupling said portable handheld device to an external communications device while said hard drive is detached from the player;

selecting one or more data and program files for download;

downloading said selected data and program files from said external communications device to said portable device;

attaching said hard drive to the player; and storing said downloaded data and program files in a disk storage medium of said hard drive.

* * * * *